(12) United States Patent
Garcia et al.

(10) Patent No.: US 10,793,298 B1
(45) Date of Patent: Oct. 6, 2020

(54) CLAMPING MECHANISM FOR A BERTHING SYSTEM

(71) Applicant: UNITED STATES OF AMERICA AS REPRESENTED BY THE ADMINISTRATOR OF NASA, Washington, DC (US)

(72) Inventors: Kelvin R. Garcia, Bethesda, MD (US); Thomas J. Hanyok, Clarksville, MD (US); Matthew S. Ashmore, Woodbine, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 398 days.

(21) Appl. No.: 15/898,377

(22) Filed: Feb. 16, 2018

(51) Int. Cl.
 *B64G 1/64* (2006.01)
(52) U.S. Cl.
 CPC .................................. *B64G 1/646* (2013.01)

(58) Field of Classification Search
 CPC ....... B64C 1/1078; B64C 1/641; B64C 1/645; B64C 1/646; B64C 2004/005; B25J 9/123; B25J 15/0253; B25J 15/026
 See application file for complete search history.

(56) References Cited

U.S. PATENT DOCUMENTS

2013/0249229 A1\* 9/2013 Roberts .................... B25J 15/00
294/198

\* cited by examiner

*Primary Examiner* — Nicholas McFall
(74) *Attorney, Agent, or Firm* — Christopher O. Edwards; Bryan A. Geurts; Helen M. Galus

(57) ABSTRACT

Disclosed is a berthing system to receive a client module, including a plurality of berthing posts, a plurality of clamping mechanisms each mounted to a respective berthing post, the plurality of clamping mechanisms movable along a berthing post to clamp a received module, wherein the plurality of clamping mechanisms are configured to assert a radial force upon the received module, wherein the plurality of clamping mechanisms each include a rotary clamping jaw that includes drawdown portion and a radial contact portion.

20 Claims, 10 Drawing Sheets

CLAMPING MECHANISM FOR A BERTHING SYSTEM

ORIGIN OF THE INVENTION

This invention described herein was made by an employee of the United States Government, and may be manufactured and used by or for the Government for Government purposes without the payment of any royalties thereon or therefore.

TECHNICAL FIELD

The invention relates generally to clamping mechanisms for mechanical parts, and more particularly clamping mechanisms in a space environment to clamp a received module to a berthing system.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Various embodiments include a berthing system to receive a client module, including a plurality of berthing posts, a plurality of clamping mechanisms each mounted to a respective berthing post, the plurality of clamping mechanisms movable along a berthing post to clamp a received module, wherein the plurality of clamping mechanisms are configured to assert a radial force upon the received module, wherein the plurality of clamping mechanisms each include a rotary clamping jaw that includes drawdown portion and a radial contact portion.

The clamping mechanisms may include a track on which the rotary clamping jaws can move back and forth.

The clamping mechanisms may include respective motors to move the clamping jaws back and forth on the track independently or substantially simultaneously.

The rotary clamping jaws may be part of a jaw carrier. The jaw carrier may include a palm to receive a ring of the client module.

The rotary clamping jaws may clamp down on the ring of the client module.

The plurality of clamping mechanisms may be configured to clamp onto the received module using a downward force.

The plurality of clamping mechanisms may be configured to clamp onto a flange of the received module.

The plurality of clamping mechanisms may be configured to move toward each other to assert the radial force on the received module.

The clamping mechanisms may each include at least one paddle to sense reception of the client module.

Various embodiments also include a method of receiving a client module at a berthing site, the method including receiving a signal that a client module is approaching the berthing site, moving a plurality of jaw carriers radially inward to receive the client module, the jaw carriers respectively mounted on clamping mechanisms, receiving the client module on the respective jaw carriers of the clamping mechanisms, and clamping the client module and moving the plurality of jaw carriers further inward to apply a radial force to the received module.

The method may include clamping a client ring of the client module using a rotary clamping jaw mounted on the respective jaw carriers. The rotary clamping jaw may include a drawdown portion and a radial contact portion.

The clamping mechanisms may be mounted on a plurality of berthing posts.

The respective jaw carriers may be driven radially inward independently or substantially simultaneously toward the client ring by a leadscrew in the clamping mechanism. The number of jaw carriers may be at least three.

The method may further include releasing the client module at an end of servicing.

The respective jaw carriers may be moved radially away from the client module at the end of servicing.

Moving the respective jaw mechanisms radially towards and radially away from the client module may be powered by respective motors in the clamping mechanisms.

The method may further include detecting the client module using a plurality of detection paddles.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

Figure 1:
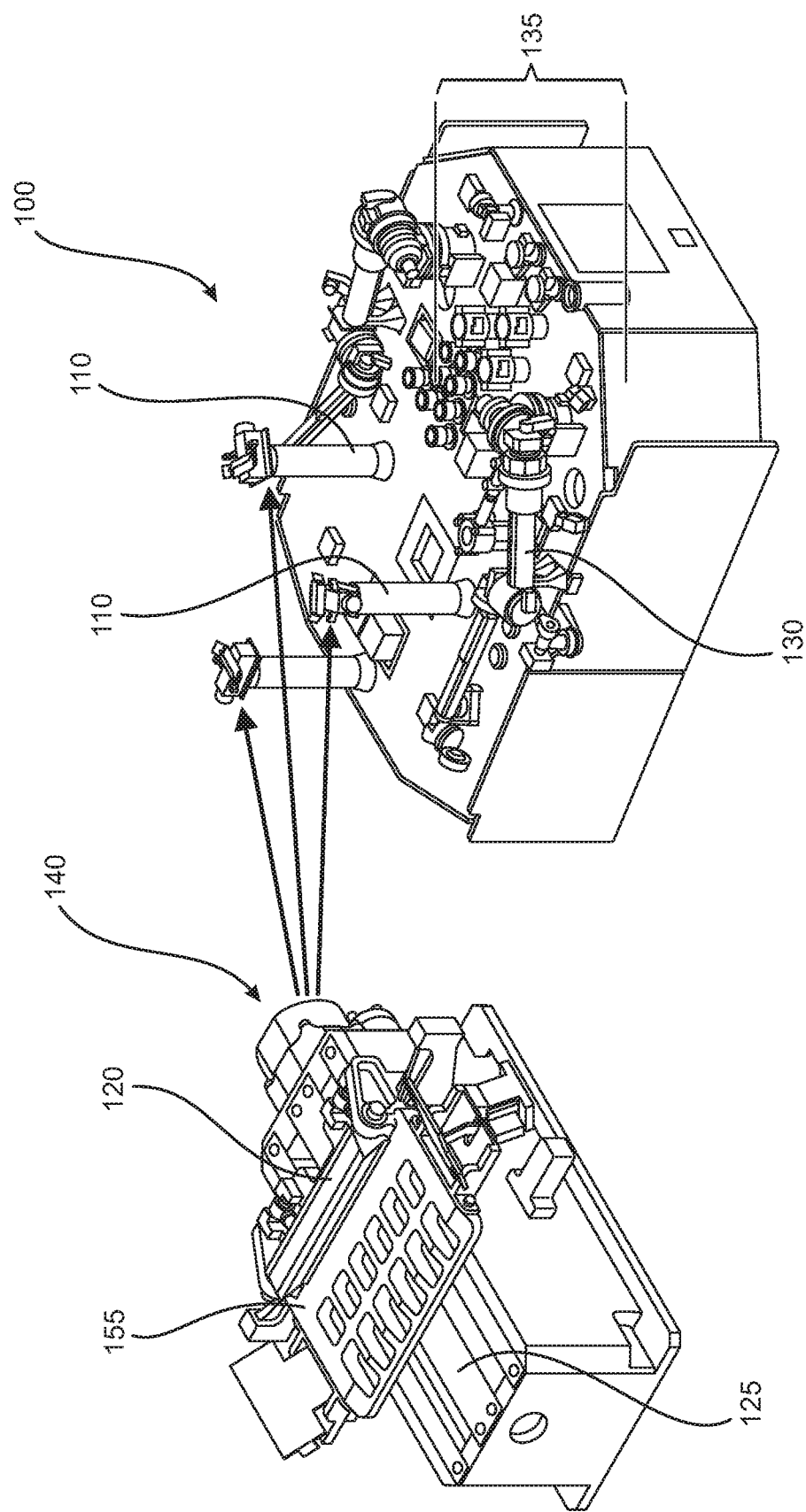
FIG. 1 illustrates a client ring detection and berthing system in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable. Values such as maximum or minimum may be predetermined and set to different values based on the application. When steps of manufacture, process of using, or other method steps are described or claimed, the order of steps given is not constrained by the order presented, and may vary. Terms such as "below," "above," "right," and "left," may be used for relative orientation of a device or apparatus as illustrated in a figure. If an apparatus or component of a figure may be rotated and still function in a similar manner to what is described, the directional terms are not limited to the orientation illustrated in a particular figure. "Below" when rotated may become "right," or "left" or "above." The same holds true for the other directional indicators.

FIG. 1 illustrates a client ring detection and berthing system 100 in accordance with embodiments described herein. The client ring detection and berthing system 100 is a receiving station designed and built to receive various modules in a space environment. One such module may be the Landsat 7 satellite. Modules to be serviced by the client ring detection and berthing system 100 may be known as client modules. The client ring detection and berthing system 100 may be referred to as a servicing mechanism.

The client ring detection and berthing system 100 may include at least three berthing posts 110 mounted on a payload deck 115. Each of the berthing posts 110 are configured to hold a clamping mechanism 140 mounted thereto. The clamping mechanism 140 may include a jaw carrier 155 on which a rotary clamping jaw 120 is mounted. The clamping mechanism 140 may also include a clamp guide 125 including rails on which the jaw carrier 155 and the rotary clamping jaw 120 move back and forth. The clamp guide 125 may enable back and forth movement of the jaw carrier 155 to receive the client module (not illustrated) during berthing and subsequently during release of the client module after servicing. An upper surface of the jaw carrier 155 may receive a client ring 210 (illustrated in FIG. 2) of a client module. The upper surface of the jaw carrier 155 may be denoted as a palm 420 (illustrated in FIG. 4).

Mounted to the payload deck 115 of client ring detection and berthing system 100 may be a plurality of robot arms 130 and attachments 135. The robot arms 130 and attachments 135 may be used by the client ring detection and berthing system 100 or an operator thereof to service a received client module. The robot arms 130 may also be used to attach to the client module to assist in berthing the client module on the berthing posts 110. The client ring detection and berthing system 100 may ensure that an approaching client module is properly aligned with the berthing posts 110 and berthed on the client ring detection and berthing system 100 during servicing of the client module. A client module that interfaces with the client ring detection and berthing system 100 may step through various stages including pre-berth, berthing, and release from the client ring detection and berthing system 100.

Berthing of a client module onto the client ring detection and berthing system 100 is accomplished via the at least three clamping mechanisms 140. As illustrated in FIG. 1, the at least three clamping mechanisms 140 may be disposed in a radial pattern of one hundred twenty degrees between each clamping mechanism 140 mounted to each of the berthing posts 110. The radial pattern is used to provide a radial inward force sufficient to hold a client module in place on the berthing posts 110 of the client ring detection and berthing system 100. The number of clamping mechanisms 140 and berthing posts 110 may be three or more. Three or more clamping mechanisms 140 mounted atop the three or more berthing posts 110 may provide security and rigidity to a client ring and client module mounted thereon. Each of the clamping mechanisms 140 is configured to have the clamp guide 125 carry the jaw carrier 155 back and forth and respectively attach and release the client ring 210 (illustrated in FIG. 2) of the client module. Movement of the jaw carrier 155 may be denoted as in-board, towards the client ring 210 and out-board, away from the client ring 210. The movement of the jaw carriers 155 may be controlled to move substantially simultaneously relative to each other, or the jaw carriers 155 may be controlled to move at different speeds toward the client ring 210.

Figure 2:
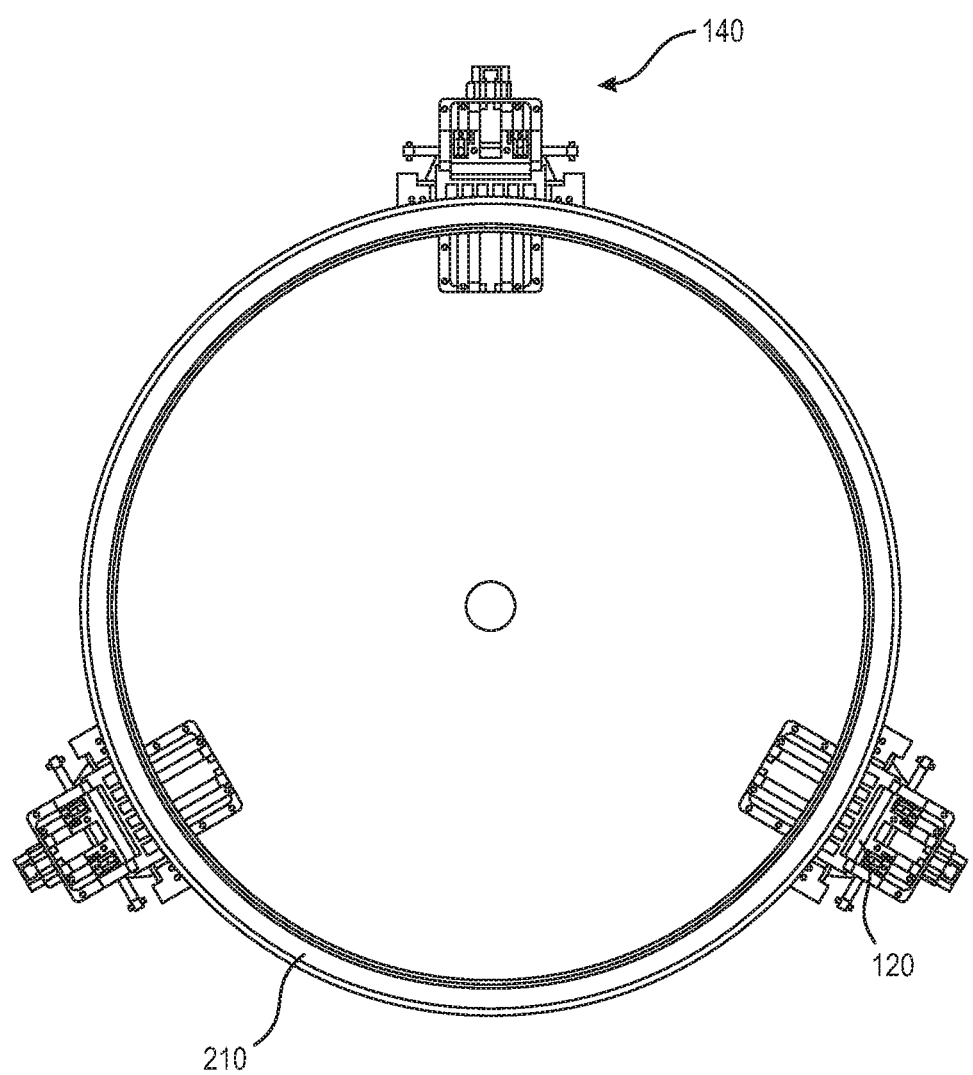
FIG. 2 illustrates the client ring and clamping mechanisms in accordance with embodiments described herein.

FIG. 2 illustrates the client ring 210 and clamping mechanisms 140 in accordance with embodiments described herein. The client ring 210 may be a marman ring. During berthing of a client module having a client ring 210, each of the rotary clamping jaws 120 of the clamping mechanisms 140 may move in-board and clamp onto the client ring 210 attached to a client module. The client ring 210 may have a client ring flange 710 to which the rotary clamping jaws 120 may grab, hold, and subsequently release from the clamping mechanism 140.

Figure 3:
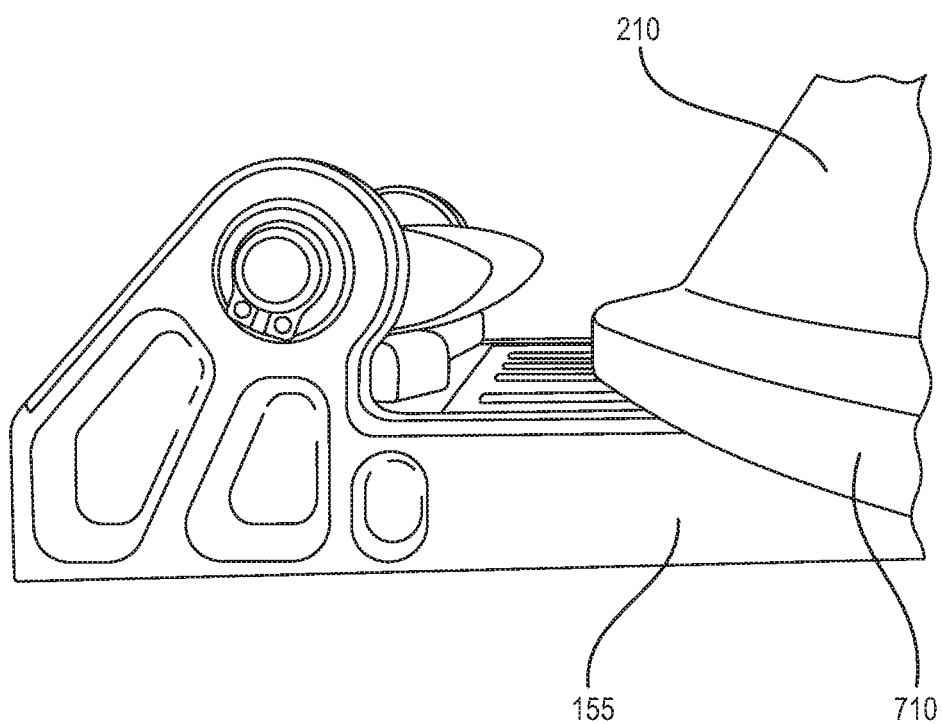
FIG. 3 illustrates a magnified view of the rotary clamping jaw in accordance with embodiments described herein.

FIG. 3 illustrates a magnified view of the rotary clamping jaw 120 in accordance with FIG. 1. As illustrated in FIG. 3, the rotary clamping jaw 120 may include a drawdown portion 310 and a radial contact portion 320. In an open position, the drawdown portion 310 may extend substantially parallel with the palm 420 of the carrier 155, having a triangular shape resembling a bird's beak. This shape may be designed to interface with specific client rings 210 or a variety of client rings 210. The radial contact portion 320 is positioned adjacent and below the drawdown portion 310. The radial contact portion 320 may a flat surface on which to couple to and receive the client ring flange 910. The rotary clamping jaw 120 also includes a jaw ring 330 around which the drawdown portion 310 and radial contact portion 320 rotates. The drawdown portion 310 may be connected to the jaw ring 330 that rotates clockwise and counter-clockwise about about an axis within a jaw molding 340. The jaw ring 330 may fit within the jaw molding 340. In a clamping phase, the drawdown portion 310 may rotate counter-clockwise about the axis within the jaw molding 340. In a release phase, the drawdown portion 310 may rotate clockwise about the axis within the jaw molding 340.

Upon receiving the client ring flange 710 of the client ring 210, the drawdown portion 310 and radial contact portion 320 may be pushed by the client ring flange 710 of the client ring 210, rotate about the jaw ring 330, and clamp down on the client ring flange 710 to secure it to the clamping mechanism 140 and to the berthing posts 110. Control of the clamping mechanisms 140 may be programmed into the client ring detection and berthing system 100, controlled by a received client module, or operations of the clamping mechanisms 140 may be controlled remotely by human operators at a ground station.

Figure 4:
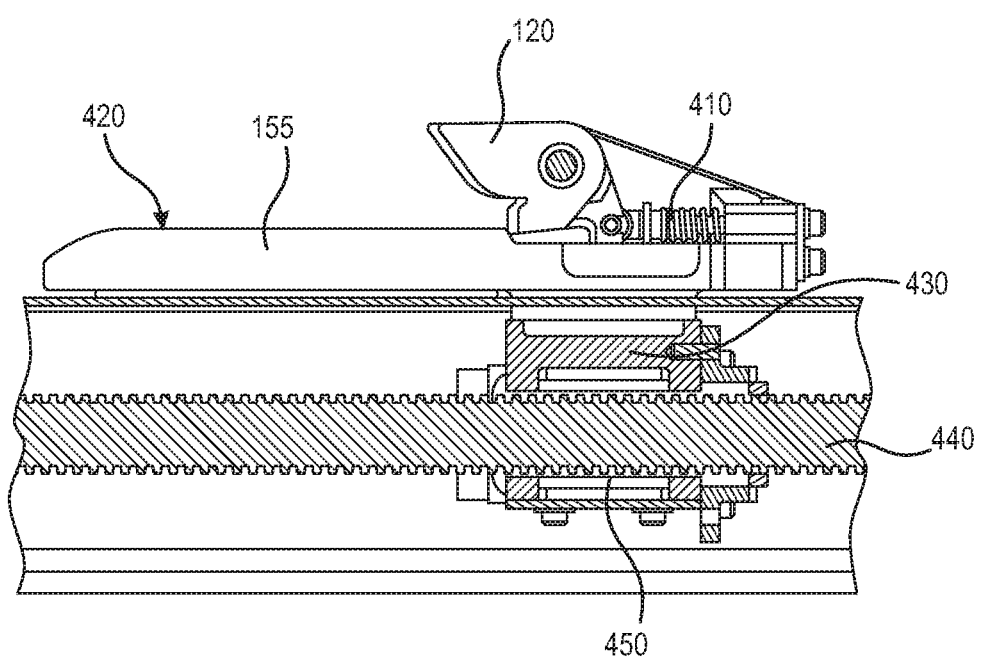
FIGS. 4 and 5 illustrate additional features of the clamping mechanism in accordance with FIG. 1.
Figure 5:
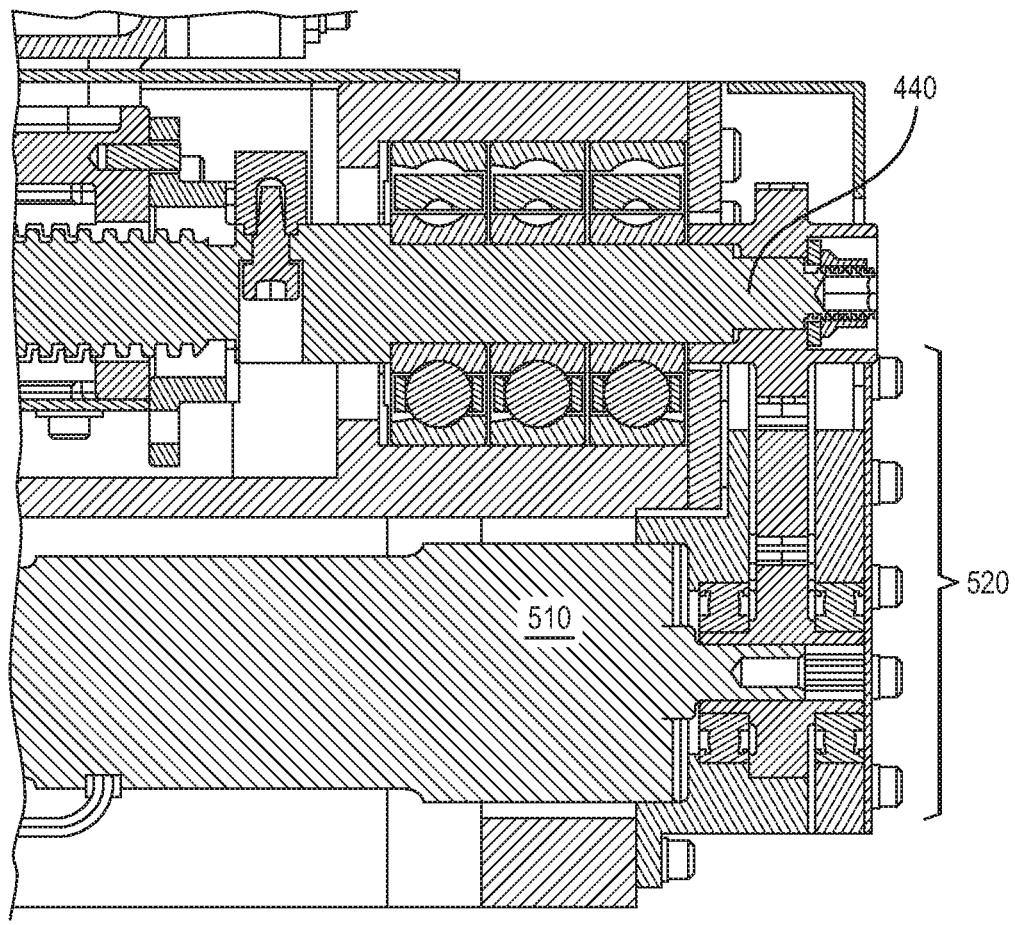

FIGS. 4 and 5 illustrate additional features of the clamping mechanism 140 in accordance with FIG. 1. Each clamping mechanism 140 may include the rotary clamping jaw 120 which is actuated along the clamp guide 125 by via a motor-driven leadscrew 440 and is guided by recirculating linear ball bearings. A motor 510 may power the back and forth movement of the jaw carriers 155. The clamping mechanism motor 510 may be a brushless DC (BLDC) motor that includes a Hall-Effect device and an integral power-off brake.

The motor 510 applies torque to the leadscrew 440 via an external idler gear set 520. During pre-berth in anticipation of the berthing of the client ring 210, the leadscrew 440 drives the jaw carrier 155 radially inward toward the client ring 210. The jaw carrier 155 is positively coupled to the screw 530 throughout the entire range of motion of the jaw carrier 155. Once the client ring 210 has berthed on the palms 420 of the jaw carrier 155, the motor 510 drives the plurality of jaw carriers substantially simultaneously inward to clamp the flange 710 of the client ring 210. Each of the jaw carriers 155 including the rotary clamping jaws 120 exert a radial force on the client ring 210. These radial forces are maintained until the jaw carriers 155 can no longer move forward, stalling the motors 510. Once a predetermined stall torque of the motors 510 are reached, power to respective motor brakes of the motors 510 will be turned off, engaging the motor brakes and then the motors 510 power will be turned off. Engagement of the brakes prior to motor de-energizing ensures no preload relaxation when power is removed from the motors 510. The motors 510 of the clamping mechanisms 140 are synchronized using velocity control with current and position feedback loops wrapped around them.

As illustrated in FIG. 4, the rotary clamping jaw 120 may be coupled to a base of the jaw carrier 155 by dual spring struts 410 on either side of the rotary clamping jaw 120. The spring struts 410 may be configured to hold the rotary clamping jaw 120 open in a default configuration of the clamping mechanism 140. The spring struts 410 cause the rotary clamping jaw 120 to remain open until the client ring 210 is centered during berthing on the jaw carriers 155. During pre-berth, depending on the size of the client ring 210, the jaw carriers 155 may be moved in-board. The client ring detection and berthing system 100 is designed such that the client ring will land on the palms 420 of the jaw carriers 155.

After the client ring 210 is mounted on the jaw carriers 155, the jaw carriers 155 may be controlled to move further in-board toward the client ring 210, abutting the radial contact portion 320 of the rotary clamping jaw 120 against the flange 710 of the client ring 210. As forces on the radial contact portion 320 overcome the force of the strut springs 410, the drawdown portion 310 is pivoted downwards about the jaw ring 330 and the rotary clamping jaw 120 begins to actuate. Approximately 50 pounds of force is divided between the two spring struts 410 of the jaw carrier 155. When releasing the client ring 210 and clamping mechanism 140 translates out-board, the rotary clamping jaw 120 is forced open, rotating about the jaw ring 330, via forces of the spring strut 410 allowing the client ring 210 to move freely from the rotary clamping jaw 120. This release of the rotary clamping jaw 120 by the opening of the spring struts 410 prevents any stiction between the client ring 210 and the rotary clamping jaw 120. The rotary clamping jaw 120 is preloaded by rear compression of the spring struts 410. The preload is not overcome under launch loads. The at least three jaw carriers 155 having rotary clamping jaws 120 will move towards and clamp onto the client ring 210 substantially simultaneously, closing in like a drill chuck clamps onto a drill bit.

Embodiments described herein include locating software used to align the jaw carriers 155 moving relatively simultaneously relative to each other on the berthing posts 110. Embodiments described herein include a berthing zone for a robotics control system using one or more robot arms to position the client ring 210 on the berthing posts 110. The berthing zone may include palms 420 of the jaw carriers 155 on the clamp guide 125 on which the client ring 210 may land in various positions, depending on the size of a client ring 210.

The robotics control system to control the landing of the client module may be housed in a ground-based facility on Earth, on the client module to which the client ring 210 is mounted, or on the client ring detection and berthing system 100. The robotics control system in accordance with embodiments described herein may guide and place the client ring 210 onto the palms 420 of the clamping mechanism 140. The placement of the client ring 210 onto the palms 420 may be within tolerances of the size of the client ring 210, in one case on the order of +/−25.4 mm (1.0"). Thus embodiments described herein may provide the client ring detection and berthing system 100 that can grasp and restrain a satellite such as Landsat 7 having a client ring 210 such as a marman ring.

A bottom of the client ring 210 surface may be 18 mm (0.71") above the palm 420 surface and may be angled within that volume up to 0.85° off parallel of a berthing plane and the rotary clamping jaws 120 may draw down and clamp the client ring 210. The client ring detection and berthing system 100 may be provided to accommodate the positioning of the client ring 210 on a client satellite such as Landsat 7 marman ring within the clamping mechanisms 140 for at least one minute.

After a client module including the client ring 210 has been serviced and attached by the clamping mechanisms 140 to berthing posts 110 and serviced by the client ring detection and berthing system 100, the client module may be released by the client ring detection and berthing system 100.

Embodiments described herein may provide for monitoring of the client module and clamping mechanisms 140 within the client ring detection and berthing system 100. The client ring detection and berthing system 100 may provide visual sensors, as needed, configured to monitor the approach, landing, clamping, and release of a client module.

There may be a predetermined client ring 210 clamping force to hold the client ring 210 in place during servicing of the client module. The forces for a satellite such as the Landsat 7 berthing are radially inboard to the client ring 210 about 400 pounds and draw down clamping of at least two hundred pounds to about four hundred pounds.

Embodiments described herein may provide for client module relative thermal growth. The client ring detection and berthing system 100 shall accommodate thermal growth while in contact with the client module. Thermal changes of the client module may range +/−15 C during servicing.

As illustrated in FIG. 5, the rotary clamping jaws 120 may each be driven by the clamping mechanism motors 510. A preload may be applied by contact between the rotary clamping jaws 120 and the client ring 210. The clamping mechanism motors 510 may apply torque to the leadscrew 440 via the external idler gear set 520. The jaw carriers 155 are mounted on respective undercarriages 430. The leadscrew 440 may drive the undercarriages 430 of the clamping mechanisms 140 radially inward toward the client ring 210. The undercarriages 430 are positively coupled to the leadscrew 440 throughout the entire range of motion of the jaw carrier 155.

When engaging the client ring 210, the drawdown portion 310 may exert a downward force on the client ring 210 which urges it toward the palm 420 as the drawdown portion 310 rises up and over the client ring flange 710, capturing the client ring 210 prior to establishing any preload.

Figure 7:
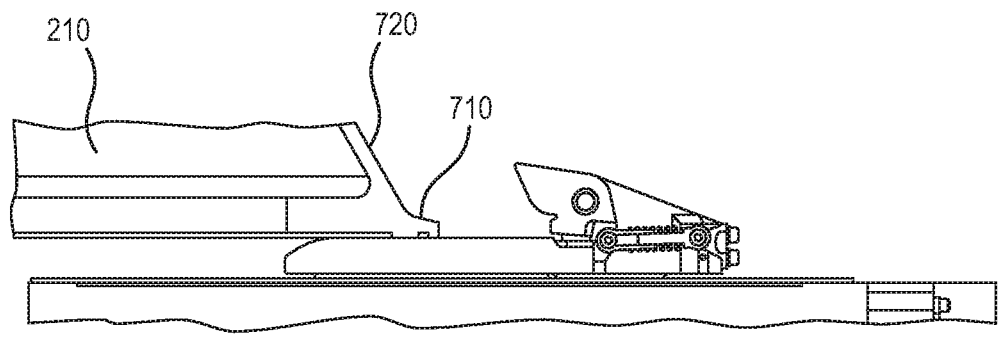
FIGS. 7-9 illustrate berthing configurations in accordance with embodiments described herein.

Once the client ring flange 710 has been drawn into the rotary clamping jaw 120 and the outer diameter surface of the client ring flange 710 makes contact with the radial contact portion 320, a force is exerted on the rotary clamping jaw 120 which induces the drawdown portion 310 to pivot in a downward direction, driving the drawdown portion 310 into contact with the client ring surface 720 (illustrated in FIG. 7).

As the jaw carrier 155 of the clamping mechanism 140 continues to drive towards the client ring 210, a radial load between the radial contact portion 320 and flange 710 increases, resulting in a commensurate increase of axial (drawdown) load about the axis of the jaw ring 330 between the radial contact portion 320 and the upper client ring 210 flange surface, squeezing the flange between the drawdown portion 310 and the palm 420.

Because a source of the axial squeeze is the rotary clamping jaw 120, a relationship between radial clamp preload and downward force preload is direct. Moreover, an instant the radial preload is removed, the downward force preload is simultaneously removed, eliminating the possibility of sticking of the client ring 210 during un-berth.

Because the downward force drawdown motion is a squeeze, relative axial motion between the client ring 210 and the rotary clamping jaw 120 during the berthing cycle is minimized.

As illustrated in FIGS. 1 and 4, the clamp guide 125 includes a linear bearing rail system. Dual parallel recirculating linear ball bearings suspend the jaw carrier 155. A mounting arrangement may provided desired stiffness while allowing the leadscrew 440 to pass between the bearings along their centerline, providing for the lowest-profile possible arrangement of drive elements.

Embodiments described herein include rail arrangement that is well suited to shimming and alignment for parallelism at assembly. Using this design, multiple options for adding degrees of freedom (DOF) are possible for differential thermal displacement between rails. A modular nut 450 allows use of either a leadscrew 440 or a ballscrew, as well as the ability to vary pitch, without modifying the jaw carrier 155 or rail set 127. The modular nut 450 couples to the jaw carrier 155 such that no side loads or moment loads are transferred to the leadscrew 440 or modular nut 450.

The clamping mechanism motor 510 includes generous torque margins on both clamping and holding the client ring 210 of the client module in the berthed configuration.

Figure 6:
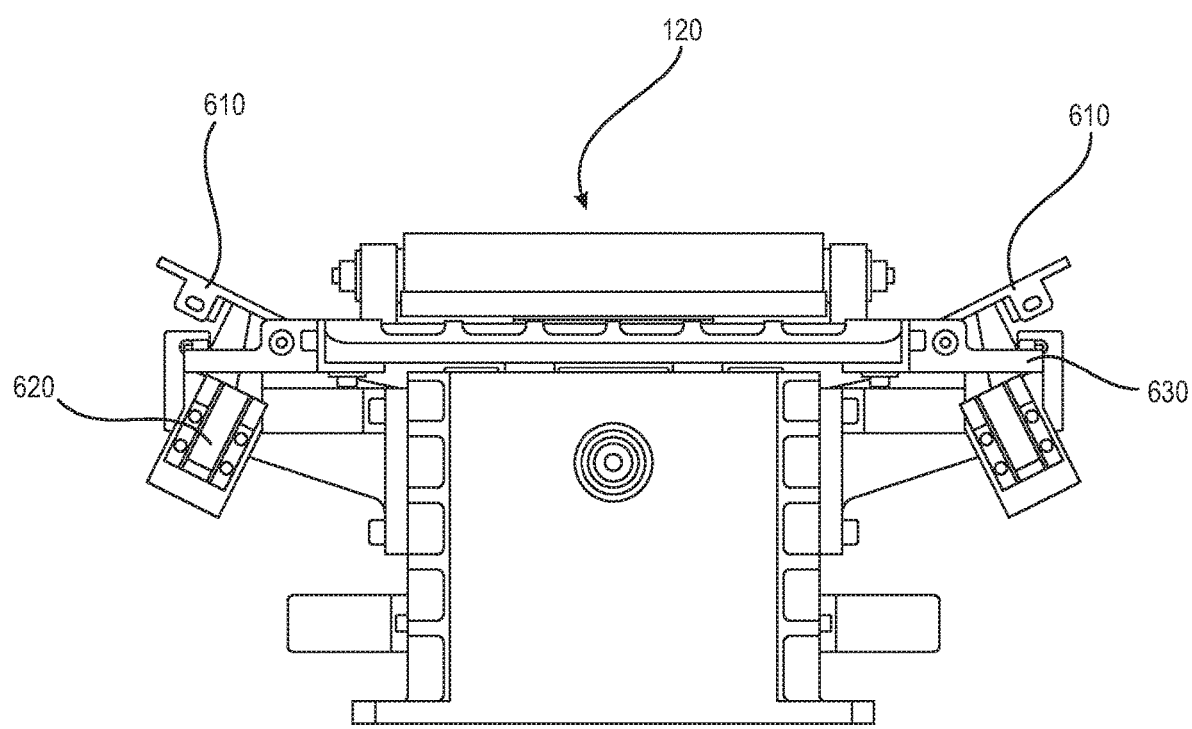
FIG. 6 illustrates features of a client ring detection system in accordance with embodiments described herein.

FIG. 6 illustrates features of a client ring detection system 100 in accordance with embodiments described herein. During an initial clamping phase, when the client ring 210 alights upon the palm 420 of the jaw carrier 155, the jaw carriers 155 are moved towards a center of client ring 210. This process may include detection of a client module by ring detection paddles 610. Detection of a client module by the ring detection paddles 610 may be signaled to a ground station which would then signal to the jaw carriers 155 to move in-board toward the client ring 210.

The clamping mechanism 140 may include the two ring detection paddles 610, each disposed on either side of the rotary clamping jaw 120. The ring detection paddles 610 may be used for physical detection of the client ring 210. FIG. 6 illustrates a detection position of the ring detection paddles 610, when the clamping mechanism 140 has been signaled to be in a ready mode to expect berthing of a client module including a client ring 210. The ring detection paddles 610 may require a predetermined threshold distance to be depressed before the clamping mechanism 140 may confirm alighting of a client module. In one example, the ring detection paddles 610 may require a depression distance on the order of 6.4 mm (0.25") to give a positive signal that berthing has begun. Other ways to determine berthing could be by force measurements. A force to move the ring detection paddles 610 may be a few ounces so that a robotic control system will not sense ring detection paddle spring forces.

The clamping mechanism 140 may also include an optical switch mounted within an optical switch housing 620 as illustrated in FIG. 6. The ring detection paddles 610 may have a trigger optical switch to determine when the client ring approaches and touches the ring detection paddles 610. This trigger optical switch may work in conjunction with spring sensors that detect a threshold of movement of the ring detection paddles 610.

Figure 8:
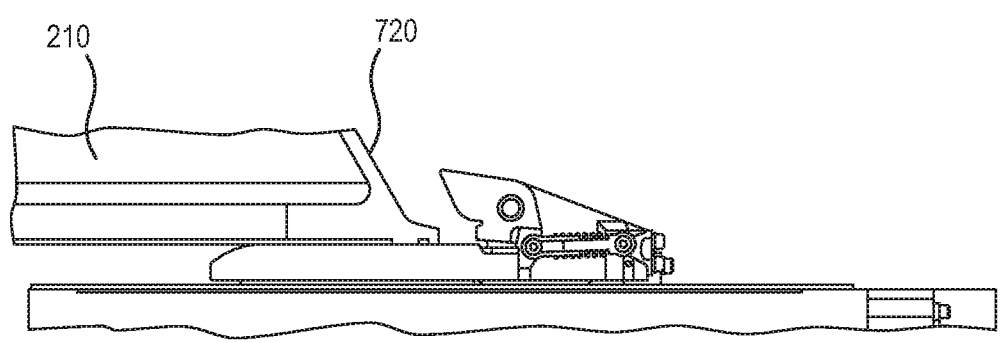
Figure 9:
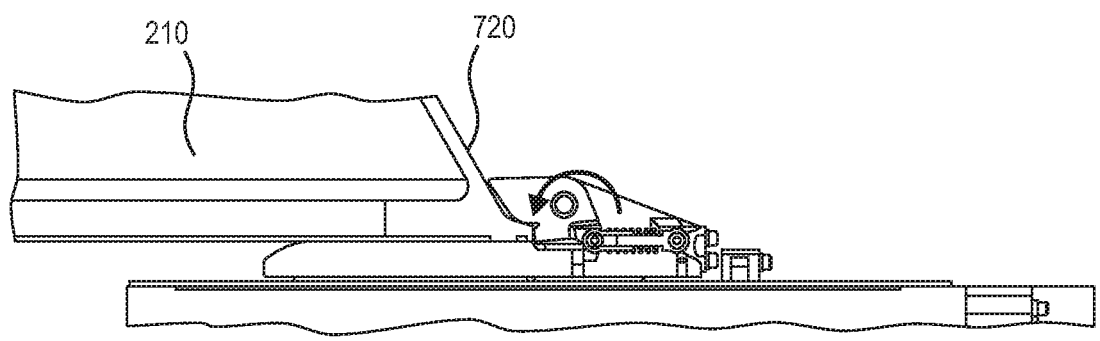

FIGS. 7-9 illustrate berthing configurations in accordance with embodiments described herein. Operation of the client ring detection and berthing system 100 will be described.

Before berthing of a client module, jaw carriers 155 of the client ring detection and berthing system 100 including palms 420 may be in radial outward, or home, position. This position may be a starting point or a rest point before a client module approaches the client ring detection and berthing system 100.

FIG. 7 illustrates a pre-berth position in accordance with embodiments described herein. In a pre-berth position, the detection system on the client ring detection and berthing system 100 or on a ground node has detected the approach of a client module. In response, either the client ring detection and berthing system 100 or the ground node may command the ring detection paddles 610 to the pre-berth position. A pre-berth position for the ring detection paddles 610 may be in which the ring detection paddles 610 have increased to an angle between zero and ninety degrees, such as about thirty degrees. This angle may be adjusted accordingly. Prior to release from their launch locks, the ring detection paddles may rest upon their associated paddle mounts 630.

Before or after the ring detection paddles 610 are angled, the jaw carriers 155 may be moved toward the area where the client ring 210 may be mounted. This translational movement may be in anticipation of the size of the client ring 210 to be mounted. Either the ground station or the client ring detection and berthing system 100 may know the size of the client ring to be mounted. In order to simultaneously move the jaw carriers 155 close enough in which the client ring to land, this pre-berth movement may be actuated. In this position, the ring detection paddles 610 may be released from a launch lock and are in the up position. In the pre-berth position, the rotary clamping jaw 120 remains in the open position. As the client ring 210 approaches the berthing zone, the robotic system including one or more robot arms may take over and guide the client module to the client ring detection and berthing system 100.

The ring detection paddles 610 may have a trigger optical switch to determine when the client ring approaches and touches the paddles. This trigger optical switch may work in conjunction with spring sensors that detect a threshold of movement of the paddles. The ring detection paddles 610 may be compressed down to trigger optical switch signaling to ground it is ok to proceed with the actuation of the mechanisms for berthing.

In operation, when the client ring 210 on a client module is at a certain height, the route of the client ring 210 will be guided down to the palms 420. The route guidance may be performed by remote guidance or by a robot arm. When the jaw carriers 155 have translated in-board, approximately 2.0" from a home position, a client ring 210 may be drawn down onto the palms 420 of the jaw carriers 155.

When a client ring has been berthed, the jaw carriers 155 have been translated in-board, approximately 2.6" from a home position, translating the client ring 210 to approximately the center of the three jaw carriers 155. As illustrated in FIGS. 7-9, from pre-berth to berth, the jaw carriers are moving substantially simultaneously radially outboard to inboard along the clamp guides 125. As forces between the client ring 210 and the radial contact portion 320 overcome the strut springs 410, the rotary clamping jaw 120 begins to actuate. As illustrated in FIG. 9, the rotary clamping jaw 120 has closed in on and clamped the flange 710 of the client ring 210. The ring detection paddles 610 have been compressed completely down.

Figure 10:
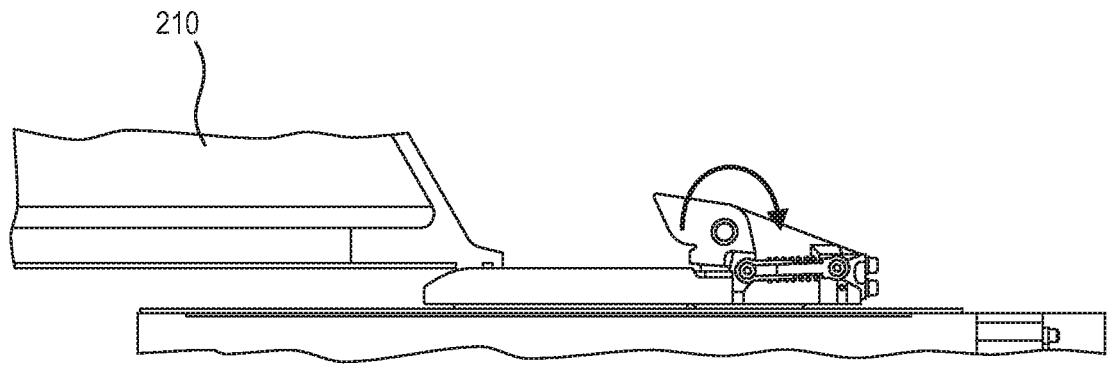
FIGS. 10 and 11 illustrate a release of the client ring in accordance with embodiments described herein.
Figure 11:
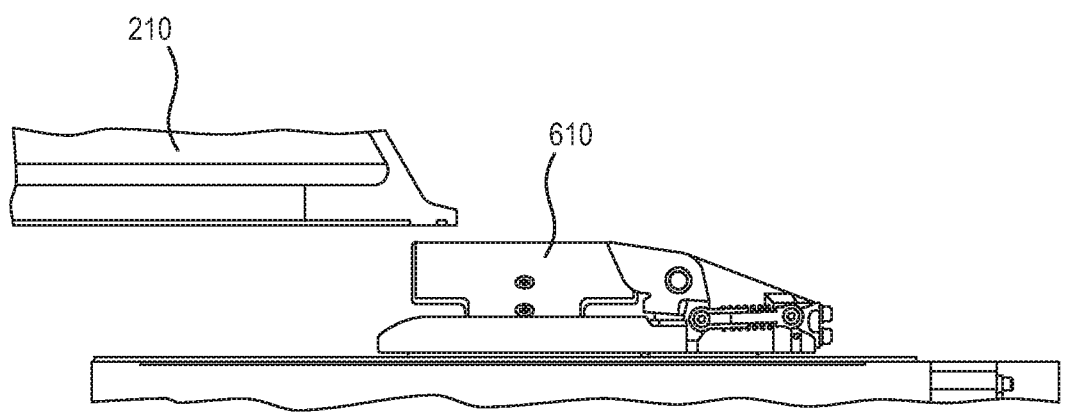

FIGS. 10 and 11 illustrate a release of the client ring 210 in accordance with embodiments described herein. As illustrated in FIG. 10, as the client ring 210 is released from the rotary clamping jaw 120, the robotic system still has control of the client ring 210. The jaw carriers 155 will translate substantially simultaneously outward on the rails of the clamping guide 125. The rotary clamping jaw 120 is forced open via forces on the strut spring 410 allowing the client ring 210 to move freely from the rotary clamping jaw 120. As illustrated in FIG. 11, the ring detection paddles 610 may rotate up as the client ring 210 is released from the rotary clamping jaw 120 under the control of the robotics control system 150. The ring detection paddle 610 forces are low and will not aid in moving the client module.

The client module may be equipped with visual indicators. The visual indicators may send signals to the ground node or to the client ring detection and berthing system 100. The Servicer module may include a vision system such that the vision system can see during berthing. The ring detection paddles 610 may be colored so that a contrast will be made between the client ring 210, paddle mounts 630, and ring detection paddles 710.

Figure 12:
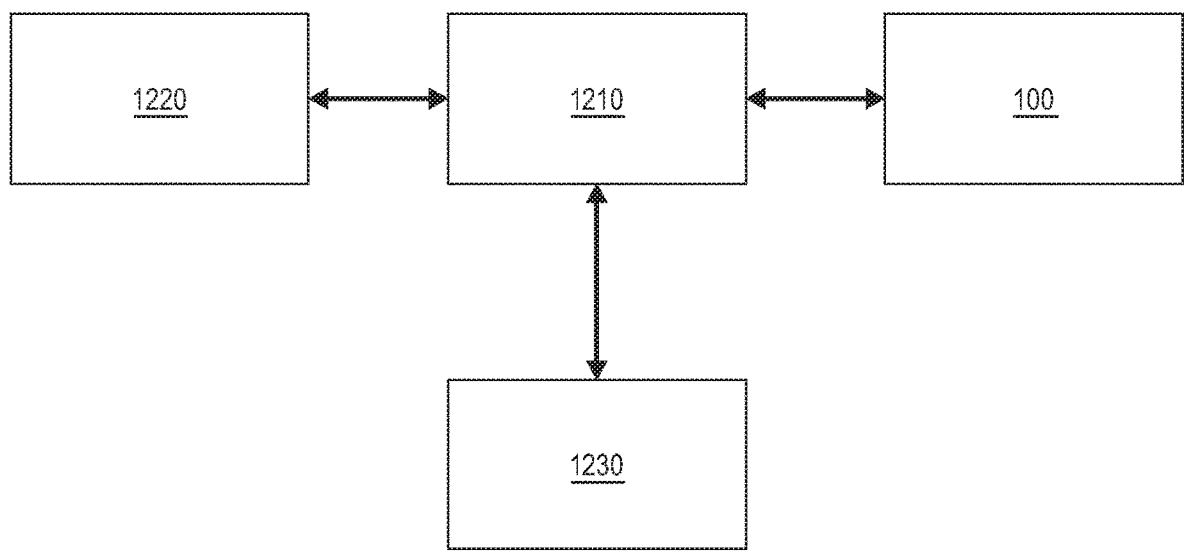
FIG. 12 illustrates a control system in accordance with embodiments described herein.

FIG. 12 illustrates a control system in accordance with embodiments described herein. The robotics control system may be part of a controller 1210. The controller 1210 may communicate with the client module 1220, the client ring detection and berthing system 100, and a ground station 1230. The controller 1210 including the robotics control system may be part of either or several of the client module 1220, the client ring detection and berthing system 100, and the ground station 1230.

Although the various embodiments have been described in detail with particular reference to certain aspects thereof, it should be understood that the embodiments described herein are capable of other embodiments and its details are capable of modifications in various obvious respects. As is readily apparent to those skilled in the art, variations and modifications can be effected while remaining within the spirit and scope of the embodiments described herein. Accordingly, the foregoing disclosure, description, and figures are for illustrative purposes only and do not in any way limit the embodiments described herein, which is defined only by the claims.

The invention claimed is:

1. A berthing system to receive a client module, comprising:
   a plurality of berthing posts;
   a plurality of clamping mechanisms each mounted to a respective berthing post, the plurality of clamping mechanisms movable along a berthing post to clamp the client module,
   wherein the plurality of clamping mechanisms are configured to assert a radial force upon the client module,
   wherein the plurality of clamping mechanisms each include a rotary clamping jaw that includes drawdown portion and a radial contact portion.

2. The berthing system of claim 1, wherein the clamping mechanisms include a track on which the rotary clamping jaws can move back and forth.

3. The berthing system of claim 2, wherein the clamping mechanisms include respective motors to move the clamping jaws back and forth on the track substantially simultaneously.

4. The berthing system of claim 1, wherein the rotary clamping jaws are part of a jaw carrier.

5. The berthing system of claim 4, wherein the jaw carrier includes a palm to receive a ring of the client module.

6. The berthing system of claim 5, wherein the rotary clamping jaws clamp down on the ring of the client module.

7. The berthing system of claim 1, wherein the plurality of clamping mechanisms are configured to clamp onto the client module using a downward force.

8. The berthing system of claim 1, wherein the plurality of clamping mechanisms are configured to clamp onto a flange of the client module.

9. The berthing system of claim 1, wherein the plurality of clamping mechanisms are configured to move toward each other to assert the radial force on the client module.

10. The berthing system of claim 1, wherein the clamping mechanisms each include at least one paddle to sense reception of the client module.

11. A method of receiving a client module at a berthing site, the method including:
    receiving a signal that a client module is approaching the berthing site;
    moving a plurality of jaw carriers radially inward to receive the client module, the jaw carriers respectively mounted on clamping mechanisms;
    receiving the client module on the respective jaw carriers of the clamping mechanisms; and
    clamping the client module and moving the plurality of jaw carriers further inward to apply a radial force to the client module.

12. The method of claim 11, further comprising clamping a client ring of the client module using a rotary clamping jaw mounted on the respective jaw carriers.

13. The method of claim 12, wherein the rotary clamping jaw includes a drawdown portion and a radial contact portion.

14. The method of claim 11, wherein the clamping mechanisms are mounted on a plurality of berthing posts.

15. The method of claim 11, wherein the respective jaw carriers are driven radially inward substantially simultaneously toward the client ring by a leadscrew in the clamping mechanism.

16. The method of claim 11, wherein the number of jaw carriers is at least three.

17. The method of claim 11, further comprising releasing the client module at an end of servicing.

18. The method of claim 17, wherein the respective jaw carriers are moved radially away from the client module at the end of servicing.

19. The method of claim 18, wherein moving the respective jaw mechanisms radially towards and radially away from the client module are powered by respective motors in the clamping mechanisms.

20. The method of claim 11, further comprising detecting the client module using a plurality of detection paddles.

* * * * *

UNITED STATES PATENT AND TRADEMARK OFFICE
CERTIFICATE OF CORRECTION

| | | |
|---|---|---|
| PATENT NO. | : 10,793,298 B1 | Page 1 of 1 |
| APPLICATION NO. | : 15/898377 | |
| DATED | : October 6, 2020 | |
| INVENTOR(S) | : Kelvin R. Garcia, Thomas J. Hanyok and Matthew S. Ashmore | |

It is certified that error appears in the above-identified patent and that said Letters Patent is hereby corrected as shown below:

On the Title Page

Item (72) Column 1, Line 2:
PLEASE CHANGE INVENTOR, THOMAS J. HANYOK, CITY/STATE FROM CLARKSVILLE, MD (US) TO BOWIE, MD (US)

Signed and Sealed this
Tenth Day of December, 2024

Katherine Kelly Vidal
*Director of the United States Patent and Trademark Office*